United States Patent
Zlatkov

(10) Patent No.: US 10,312,019 B2
(45) Date of Patent: Jun. 4, 2019

(54) METHOD FOR PRODUCING A PERMANENT MAGNET AND PERMANENT MAGNET

(71) Applicant: Volkswagen Aktiengesellschaft, Wolfsburg (DE)

(72) Inventor: Branislav Zlatkov, Wr. Neustadt (AT)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 425 days.

(21) Appl. No.: 14/442,935

(22) PCT Filed: Oct. 24, 2013

(86) PCT No.: PCT/EP2013/072325
§ 371 (c)(1),
(2) Date: May 14, 2015

(87) PCT Pub. No.: WO2014/075890
PCT Pub. Date: May 22, 2014

(65) Prior Publication Data
US 2015/0294787 A1    Oct. 15, 2015

(30) Foreign Application Priority Data

Nov. 14, 2012 (DE) .......... 10 2012 022 223
Mar. 16, 2013 (DE) .......... 10 2013 004 985

(51) Int. Cl.
*H01F 41/02* (2006.01)
*H01F 7/02* (2006.01)
(Continued)

(52) U.S. Cl.
CPC ........ *H01F 41/0266* (2013.01); *B22F 1/0018* (2013.01); *B22F 1/02* (2013.01);
(Continued)

(58) Field of Classification Search
None
See application file for complete search history.

(56) References Cited

U.S. PATENT DOCUMENTS

| 5,595,608 A * | 1/1997 | Takebuchi ............ H01F 1/0577 |
| | | 148/103 |
| 2007/0065677 A1* | 3/2007 | Satsu ..................... C23C 22/02 |
| | | 428/692.1 |

(Continued)

FOREIGN PATENT DOCUMENTS

| CN | 1234589 A | 11/1999 |
| CN | 102483991 A | 5/2012 |

(Continued)

OTHER PUBLICATIONS

Office Action for Chinese Patent Application No. 201380070272.2, dated Dec. 16, 2016.

(Continued)

*Primary Examiner* — Xiaowei Su
(74) *Attorney, Agent, or Firm* — Pearl Cohen Zedek Latzer Baratz LLP

(57) ABSTRACT

A method for producing a permanent magnet, comprising the step: (a) providing a powder of a magnetic material, (b) coating the powder particles with a coating of a diamagnetic or paramagnetic coating material, (c) compressing the coated particles to form a pressed part, (d) heat treatment to sinter the coating material at a temperature less than a temperature suitable for sintering the magnetic material, while the coating material transfers to a matrix of a diamagnetic or paramagnetic material, which embeds the particles of the magnetic material, and (e) magnetizing the magnetizable material in an external magnetic field, wherein the steps (c), (d) and (e) are carried out in any order successively or at the same time in any desired combination. The nanostructured permanent magnet that can be produced by mean (Continued)

Figure 1:
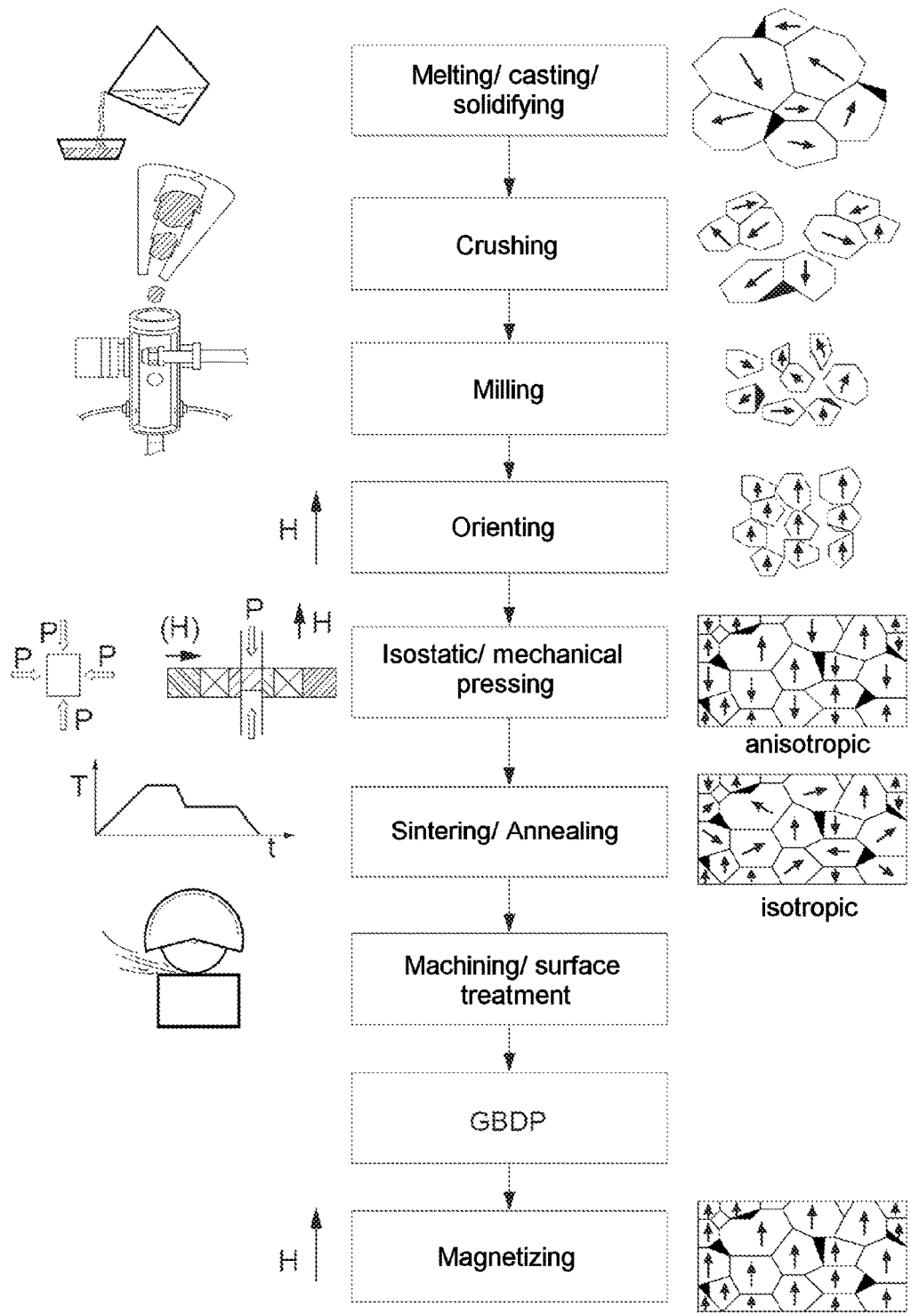

of said method comprises cores of a permanently magnetic material having a mean particle diameter of no more than 1 μm and a matrix of a diamagnetic or paramagnetic material in which the cores are embedded.

15 Claims, 5 Drawing Sheets

(51) Int. Cl.
    *H01F 1/055*     (2006.01)
    *H01F 1/057*     (2006.01)
    *H02K 1/27*     (2006.01)
    *B32B 15/01*     (2006.01)
    *C22C 38/00*     (2006.01)
    *B22F 1/00*     (2006.01)
    *B22F 1/02*     (2006.01)

(52) U.S. Cl.
    CPC ............ *B22F 1/025* (2013.01); *B32B 15/012* (2013.01); *B32B 15/013* (2013.01); *B32B 15/015* (2013.01); *C22C 38/002* (2013.01); *C22C 38/005* (2013.01); *H01F 1/0552* (2013.01); *H01F 1/0572* (2013.01); *H01F 7/021* (2013.01); *H01F 41/0273* (2013.01); *H02K 1/27* (2013.01); *B22F 2998/10* (2013.01); *C22C 2200/02* (2013.01); *C22C 2202/02* (2013.01)

(56) References Cited

U.S. PATENT DOCUMENTS

| | | | | |
|---|---|---|---|---|
| 2008/0054738 A1* | 3/2008 | Komuro | ............... | B82Y 10/00 310/46 |
| 2010/0003156 A1* | 1/2010 | Suzuki | ............... | B22F 1/025 419/10 |
| 2011/0037548 A1 | 2/2011 | Ozeki et al. | | |
| 2011/0057756 A1* | 3/2011 | Marinescu | ............. | B22F 1/007 335/302 |
| 2011/0267160 A1 | 11/2011 | Ozeki et al. | | |
| 2012/0182105 A1* | 7/2012 | Ozeki | ............... | C22C 1/0441 335/302 |
| 2012/0286191 A1 | 11/2012 | Maeda et al. | | |
| 2012/0319807 A1* | 12/2012 | Zeitler | ................. | H01F 1/0578 335/296 |
| 2013/0092867 A1* | 4/2013 | Shoji | ................... | H01F 1/0572 252/62.51 R |

FOREIGN PATENT DOCUMENTS

| | | |
|---|---|---|
| CN | 102639266 A | 8/2012 |
| CN | 102665970 A | 9/2012 |
| CN | 102682949 A | 9/2012 |
| EP | 0255816 A2 | 2/1988 |
| EP | 0 945 878 | 9/1999 |
| EP | 1211700 A2 | 6/2002 |
| EP | 1744328 B1 | 1/2007 |
| EP | 2 477 199 A1 | 7/2012 |
| EP | 2 508 279 A | 10/2012 |
| JP | S62-152107 A | 7/1987 |
| JP | H01272101 A | 10/1989 |
| JP | H03295205 A | 12/1991 |
| JP | H08-111306 A | 4/1996 |
| JP | 2004-349585 A | 12/2004 |
| JP | WO 2011064636 A1 * | 6/2011 ........... H01F 1/0572 |
| WO | WO-2011054746 A1 * | 5/2011 ........... H01F 1/0578 |

OTHER PUBLICATIONS

International Search Report for International Application No. PCT/EP2013/072325, dated Feb. 3, 2014.

* cited by examiner

State of the Art

METHOD FOR PRODUCING A PERMANENT MAGNET AND PERMANENT MAGNET

The invention concerns a process for producing a permanent magnet and a permanent magnet that can be produced by this process.

The demand for high-performance permanent magnets, which are used for example in electrical machines, is continuously increasing. In particular, permanent magnets are used in electric motors for motor vehicle traction, which are attracting more widespread interest with increasing electromobility. The main magnetic or magnetizable alloys with high coercive forces are rare earth alloys of the type RE-TM-B or RE-TM, with RE being a rare earth element, TM a transition metal of the iron group (Fe, Co, Ni) and B boron. In manufacturing magnets from these materials, as a rule, one attempts to achieve the smallest possible particle size of the finished magnet, specifically in the dimension of magnetic domains (<1 µm, ideally 200 to 400 nm), so that the compact magnet will ideally be composed of single-domain crystals, which allows particularly high magnetic field strengths to be achieved.

Typical manufacturing processes include the process steps of pulverizing the magnetic starting material, pressing the material into a green body with or without an external magnetic field to form a desired shape, sintering of the green body for further compression (high-temperature treatment), optional annealing (heat or low-temperature treatment) in order to reduce stress and stabilize the structure of the magnetic body, machine post-processing (cutting, grinding), and magnetization in a magnetic field. In some cases, process stages are also combined with one another, or the sequence is varied. For example, the hot pressing method is known, in which pressing takes place at a temperature which leads to mechanical compression of the magnetic material and thus obviates the need for a separate sintering process. In addition, pressing is frequently carried out in an external magnetic field, which gives rise to magnetically anisotropic magnets, so that subsequent magnetization is not necessary. In hot pressing, no magnetic field is used during pressing. Rather, the components are magnetized after pressing.

In the sintering process used in prior art, the pulverized magnet material is exposed to high temperatures just below the melting temperature of the magnet material. With the aforementioned rare earth metal alloys, a sintering temperature of between 1,000 and 1,150° C. with a sintering time of 1-3 hr is typically used (with correspondingly lower temperatures in the case of simultaneous application of pressure). This results in compressing and mechanical bonding of the particles. Partial melting of the particle surfaces also occurs, so that said particles are also materially bonded to one another at their core boundaries (liquid-phase sintering). An undesirable side effect of sintering is crystal growth, which even in the use of extremely fine particle powders having particle diameters in the target range of <1 µm leads to particle sizes on the order of 3 to 10 µm. However, these particles adversely affect the magnetic performance of the magnet.

A further problem of the aforementioned magnet material is that the alloys are particularly pyrophoric, particularly in powder form, i.e. they tend to ignite in the presence of oxygen and moisture. This requires special protective measures during manufacturing, for example processing under inert protective gases and subsequent coating or embedding of the magnet. The tendency of the magnet alloys to corrode, which also leads to diminished magnetic performance, is also problematic.

In order to increase the temperature resistance of the magnet, a further process step is known in prior art as the "Grain Boundary Diffusion Process" (GBDP). In this process, an additional substance is introduced into the magnet by diffusion, such as dysprosium, terbium, or copper. This substance accumulates between the crystal boundaries and increases the structural stability of the crystal lattice of the grains and thus its temperature stability. A drawback of the GBDP is that the process step is costly and time-consuming. Moreover, the diffusion process is limited to a material thickness in the range below 5 mm, and this gives rise to a problematic concentration gradient of the material used. Use on substantially thicker magnets may therefore cause the magnet to show non-homogeneous magnetic field strength. Moreover, the magnets manufactured in this manner must be protected from corrosion. For this purpose, coatings of nickel, epoxy resin, etc can be used.

EP 1744328 B1 describes a manufacturing process for a magnet, wherein a powder of a magnetic material of the type RE-Fe-B is manufactured, and this is first impregnated with a rare earth dioxide powder and then with a glass powder from a polyvinyl alcohol solution, so that coated magnetic particles are obtained. After drying, these particles are first formed at increased pressure (49 MPa) in a magnetic field into green bodies, and these are heat sealed or heat forged in a heating process into magnets (294 MPa, 730° C.). This yields a structure in which the magnetic particles are embedded in a matrix that shows a glass phase with the particles of the rare earth dioxide dispersed therein. At the interfaces between the magnetic particles and the glass phase, a layer is formed that is composed of an alloy phase of the magnetic material and the rare earth element and particles of the rare earth dioxide dispersed therein (cf. FIG. 1 of EP 1744328 B1). A variant of the process described above has also been disclosed in which the powder of the magnetic material is first coated with a rare earth dioxide in a sputtering process. After this, the above-described wet impregnation with the rare earth dioxide powder and the glass powder is again carried out, with the subsequent drying, forming, and hot pressing. In this case, one obtains a structure that differs from the previous one in that it has an additional layer arranged between the alloy layer and the magnetic particles which consists of the rare earth dioxide (cf. FIG. 2 of EP 1 744 328 B1).

JP 01272101 A (Abstract) discloses treatment of the surface of a powder of a magnetic material of the type RE-TM-B with an alkali silicate, e.g. so-called water glass ($Na_2O/SiO_2$), potassium silicate, or lithium silicate.

According to JP 03295205 A, a rare earth alloy is pulverized and the powder is impregnated in an aqueous solution with water glass ($Na_2O/SiO_2$). The coated particles coated with water glass in this manner are dried, formed, and hot-pressed.

From EP 0255816 A2, a manufacturing process is known for magnets based on a RE-Fe—B-alloy, in which the starting material is first crushed and processed into a powder. The powder is then subjected to heat treatment at 300 to 1000° C. and then coated with a ceramic or metallic corrosion protection layer, wherein the metallic layer is produced by electrolytic means. The coated particles manufactured in this manner are pressed into a magnet with or without using a magnetic field, wherein additives of a metal, ceramic, or plastic powder may be added to the powder to be pressed in order to improve its strength.

According to US 2011/0037548 A1 a magnetic material (e.g. Nd—Fe—B) is pulverized in a wet milling process to obtain particle sizes of <3 µm and processed with an organic compound of a high-melting-point metal or a precursor of a high-melting-point ceramic into a slurry, wherein the magnetic particles are coated with the organic metal compound or the ceramic precursor. As high-melting-point metals, Ta, Mo, W, and Nb are mentioned, and as ceramics, BN and AlN. After adding a thermo- or duroplastic polymer binder, the slurry is molded into a desired state and sintered at temperatures of between 1,100 and 1,150° C. This causes the organic metal compound or ceramic precursor to form a layer surrounding the magnetic particles, which is intended to prevent crystal growth during sintering. The process described in US 2011/0267160 A1 differs from the above chiefly in that instead of using a binder, the organic metal compound or ceramic precursor is used in dissolved form in a corrosion-inhibiting, mineral, or synthetic oil.

Starting from the prior art, the object of the present invention is to provide a process for producing a permanent magnet, by means of which magnets can be manufactured more easily and in a more economical manner that are resistant to temperature and corrosion and show high magnetic performance. The object of the invention is also to provide a magnet having improved temperature and corrosion resistance.

These objects are achieved by means of a manufacturing process for producing a permanent magnet, a permanent magnet that can be produced by means of this process, and an electrical machine that includes the features specified in the independent claims.

The process according to the invention for producing a permanent magnet comprises the following steps:
  (a) providing a powder of a magnetic material,
  (b) coating of the powder particles with a layer of a diamagnetic or paramagnetic coating material,
  (c) pressing of the coated particles into a compact,
  (d) sintering of the coating material at a temperature that is lower than a suitable temperature for sintering (and melting) of the magnetic material, while transferring the coating material into a matrix of a diamagnetic or paramagnetic material in which the particles of the magnetic material are embedded, and
  (e) magnetizing the magnetic material in an external magnetic field,
wherein steps (c), (d) and (e) are carried out in any desired sequential order or simultaneously in any desired combinations.

The process according to the invention is characterized in particular in that the sintering of the coating material is carried out at a temperature that is lower than a sintering temperature of the magnetic material (also referred to in the following as magnet material). In other words, the sintering step (d) of the process is carried out under conditions at which no sintering of the magnetic material takes place. In particular, in step (d) the sintering is carried out at a temperature that corresponds at the most to a transition or melting temperature of the coating material (depending on whether it is an amorphous or crystalline material). Accordingly, the sintering in step (d) occurs exclusively with melting of the coating material and not with sintering of the magnetic material of the magnetic cores. Preferably, the entire process is conducted under conditions in which no sintering of the magnetic material occurs. This means that no conditions are used in any process step (in particular temperature and pressure) that lead to sintering of the magnetic material. In this context, it is essential to take into account that the transition and melting temperatures of the materials are pressure dependent, and that the sintering temperature must therefore be selected taking into consideration the pressure. Thus, if one simultaneously uses in a single process step elevated pressure and an elevated temperature, for example by combining steps (c) and (d), the process temperature is to be selected differently than in pressure-free sintering. In every case, the conditions are to be selected in such a way that they result at the most in sintering of the coating material, but not of the magnetic material.

By means of the process control according to the invention while avoiding sintering of the magnetic material, in particular in sintering step (d), undesirable crystal growth of the magnetic particles is prevented. This effect is further increased because the particles have a coating that prevents adjacent magnetic particles from growing together during pressing and/or sintering. As a result, the diameter of the magnetic cores of the finished magnet essentially correspond to the diameter of the powder particles used, which for example is ≤3 µm, and preferably ≤1 µm, in particular 200 to 400 nm. According to the invention, a magnet is thus obtained that is essentially composed of single-domain particles or single-domain crystallites and thus shows higher coercive field strength and improved temperature resistance. At the same time, the lower particle sizes lead to more dense crystal packing and thus to greater mechanical strength (hardness).

Additional positive effects are achieved by coating the magnetic particles. For example, the corrosion resistance of the magnetic material is increased. At the same time, the coating of the magnetic particles leads to passivation of the particle surfaces. This eliminates the risk of self-ignition on contact with air of the highly pyrophoric magnetic material, which applies in particular during powder handling. In this manner, it becomes much easier to carry out the process; for example, it is not necessary to work under an inert gas atmosphere after carrying out coating. Moreover, the dielectric insulation effect of the para- or diamagnetic matrix in connection with the small particle size leads to a reduction in the eddy currents occurring in the magnet. This in turn leads to increased field strength and prevents undesired heating of the magnet.

The process is also characterized by high flexibility with respect to the materials used, both the magnetic material and the coating or matrix material. In addition, the process can be carried out more rapidly and less expensively than the GBDP process described above.

Of course, the specific temperature selected in step (d) depends on the coating material, in particular on its gas transition or melting temperature. For example, the transition temperature of many glasses which constitute examples of preferred matrix materials in the present invention (see below) is in the range of up to 900° C. In this case a preferred temperature range for sintering is 400 to 800° C., and in particular 550 to 650° C., when one is working under normal pressure. In particular, the sintering temperature is at least 50° C., and preferably at least 100° C., below the transition or melting temperature of the coating material. If sintering is carried out under pressure, for example simultaneously with step (c) of pressing, correspondingly lower temperatures are used.

In the present invention, the term "starting material" is understood to refer to the material directly used in step (b) to produce the coating material (educt) before its deposition. "Coating material", on the other hand, refers to the material of the coating deposited on the surface of the particles in step (b). The starting material and the coating material may be chemically identical or different. The term "matrix material" refers to the material of the matrix present in the finished permanent magnet, in which the particles are embedded. The matrix material and the coating material may also be chemically identical or different. In the preferred embodiments of the invention, in which the matrix material is a glass, a glass ceramic, a ceramic, or a metallic glass, the starting material, the coating material, and the matrix are commonly different from one another, i.e. the starting material constitutes a precursor for the coating material and the coating material a precursor for the matrix material.

In the present invention, moreover, a "magnet material", "magnetic material", or a "permanent magnetic or permanently magnetic material" is understood to refer to a ferromagnetic or ferrimagnetic active substance, which after magnetization permanently produces a magnetic field and attracts or repels other ferro- or ferrimagnetic bodies (depending on the direction of the magnetic poles). Such an active substance is used in the process as the powder material to be coated, and on completion of the process chain forms the magnetic cores of the finished magnet. In contrast, the phase of the matrix material derived from the coating material, which surrounds and embeds the magnetic cores, is a para- or diamagnetic active material, i.e., in common parlance, it is not magnetic.

As a rule, the coating in step (b) may be conducted by any desired process, including wet techniques such as the sol-gel process and dry deposition processes. In this case, the coating preferably takes place by means of a dry deposition process, in particular by means of a chemical or physical gas separation process. Dry deposition processes have the advantage over wet processes of not requiring any solvents, some of which are expensive, and thus also no measures for solvent disposal or repurification. In addition, energy-intensive drying processes are not needed. At the same time, the chemical and physical gas separation processes can be carried out with a high degree of flexibility with respect to the coating materials that may be used. In this context, physical gas separation processes (PVD, physical vapor deposition) are understood to refer to vacuum-based coating processes in which the starting material is converted to the gas phase using various physical processes and is then deposited on the substrate to be coated (magnetic particles), usually by condensation. The different variants of PVD differ chiefly in the way in which the starting material is converted to the gas phase. A particular distinction is made between evaporation processes and sputtering. The evaporation processes include thermal evaporation, laser beam evaporation, arc evaporation, and electron beam evaporation. In sputtering, on the other hand, the starting material is sputtered by ion bombardment. All of these processes may be used within the scope of the present invention. In chemical gas phase deposition as well (CVD, chemical vapor deposition), the starting compound is converted to the gas phase using various techniques. CVD differs from physical processes in that a chemical reaction causes deposition of the coating material on the surface of the substrate as a solid component due to a chemical reaction of the components present in the gas phase. In this case, the starting material is present in volatile form in the gas phase and is deposited as a less volatile compound, e.g. as an elemental compound or an oxide.

Preferably, the entire process for producing a permanent magnet, with the possible exception of a wet process for producing the magnetic powder, should be carried out exclusively by means of dry processes.

As matrix materials for the present invention, diamagnetic or paramagnetic materials are used. In particular, these are glass materials, glass ceramics, ceramics or metallic glasses, but also paramagnetic or diamagnetic metals, for example Dy, Tb, Al, Pt, Ti, Cu, Pb, Zn, Ga, Ge, Au, Ag, Mg, Mo, Mn, Zr, Li, etc., or alloys or oxides thereof. It is also possible to use mixtures of the aforementioned materials. Particularly preferred as the matrix material are a glass, a glass ceramic, a ceramic, or combinations thereof. Glasses are understood to refer to amorphous substances that are present structurally as an irregular structure (network) (in contrast to crystalline substances, which occur in an ordered lattice structure). Chemically, glasses are based on $SiO_2$ and other metal oxides, in particular $Al_2O_3$, $Na_2O$, $K_2O$, MgO, CaO, $B_2O_3$, $TiO_2$, PbO, $P_2O_5$ and others. Glasses preferred in the present case include quartz, crown glass, soda lime glass, float glass, and borosilicate glass. Most glass compositions include mixtures of various oxides with variable $SiO_2$ components. The various oxides are present in the glass not as separate low-molecular-weight molecules, but in the form of extended glass networks. For example, silicon oxide is present as a silicate in the form of mutually crosslinked $SiO_4$ tetrahedrons. As a rule, glass ceramics show the same or similar chemical compositions as the glasses. They differ from glasses in that in addition to glassy phases, polycrystalline phases are also present. Ceramic materials include mineral silicate materials, i.e., like the glasses or glass ceramics, $SiO_2$- or $SiO_4$-based materials such as kaolins or clay minerals, oxide ceramics, which are based on aluminum oxide, beryllium oxide, or other materials, non-oxide materials and carbides and nitrides such as silicon carbide SiC, boron carbide BC, or boron nitride BN. With respect to chemical composition, there are differences between the ceramic materials and the glasses or glass ceramics. Metallic glasses are understood to refer to metal alloys that unlike conventional metals or metal alloys are amorphous, i.e. show no ordered lattice structure.

Glasses, glass ceramics, or ceramics are characterized by particularly high anti-corrosive properties and resistance to ignition.

The diamagnetic or paramagnetic matrix material is to be selected in such a way that it has a lower transition temperature $T_g$ or melting temperature $T_m$ than the magnetic material so that the latter will not undergo sintering during the sintering process. Preferably, the transition temperature $T_g$ or melting temperature $T_m$ should be at least 100 K, in particular at least 200 K below the melting temperature of the magnetic material. The transition temperature $T_g$ or melting temperature $T_m$ can be determined, for example, by a calorimetric process (differential scanning calorimetry, DSC).

Preferably, in step (b) of the process, a chemical precursor material of the diamagnetic or paramagnetic matrix material is used as the starting material. For the production of glasses, glass ceramics, or ceramics, which are composed primarily of oxide materials, examples of suitable substances, depending on the coating selected, include salts or volatile compounds such as hydrides. In particular, precursor compounds of the elements Si, Al, Na, K, Mg, Ca, B, P, Pb, Ti, Li, Be and others are used, depending on the composition of the matrix material to be produced. After decomposition, these compounds often give rise to the corresponding elemental components, which when still in the gas phase or after deposition on the particle surface react to form the corresponding oxides. As a rule, at the end of the coating step (b), these materials are present in oxide form with a fine particulate structure ("white rust"). Only after sintering do these oxides give rise to the desired glass, ceramic, or glass ceramic materials.

The magnetic material is in particular a ferromagnetic metal, and preferably a ferromagnetic metal alloy. In particular, alloys of the type RE-TM-B or RE-TM are used in this case, wherein RE denotes a rare earth element, TM a transition metal of the iron group (iron Fe, cobalt Co, nickel Ni), and B boron. A typical representative of the first type are Nd—Fe—B alloys, while alloys of Sm and Co are examples of the second type. Such alloys are characterized by particularly high coercive field strength.

The powder of the magnetic material prepared in step (a) should preferably have a maximum particle diameter of 3 µm, and preferably at the most 1 µm. Preferably, the particle diameter is in the range of 0.1 to 0.6 µm (100 to 600 nm), and particularly preferably in the range of 0.2 to 0.4 µm (200 to 400 nm). Particle diameters in this range essentially correspond to the size of magnetic domains, so that the aforementioned diameters show particularly high magnetic field strength. As explained above, the particle diameters used are obtained by means of the process according to the invention and are therefore also present in the finished magnet in the form of so-called single-domain particles.

Preferably, in step (b), the maximum coating thickness of the coating material produced is 100 nm. In particular, the coating thickness is in the range of 1 to 10 nm, and preferably in the range of 2 to 5 nm. On the one hand, these coating thicknesses are sufficient to achieve satisfactory magnetic insulation and passivation of the inflammable particles. On the other hand, the coating thicknesses are low enough so that they do not substantially limit the magnetic field density of the magnet.

A further embodiment of the present invention concerns a nanostructured permanent magnet comprising cores of a permanent magnetic material with a mean particle diameter of a maximum of 3 µm, preferably at the most 1 µm, and a matrix of a diamagnetic or paramagnetic material in which the cores are embedded. In this case, the cores are derived from the powder of the magnetic material used and are therefore chemically equivalent to it. The matrix material, conversely, is derived from the sintered coating material. Accordingly, the above explanations concerning the magnetic material and the matrix material also apply to the finished magnet.

In this case, "nanostructured" is understood to refer to the inner structure of the magnet at which the dimensions of the structural elements (cores) are within the range of the above-mentioned dimensions.

The nanostructured permanent magnets according to the invention may be used in any application in which conventional magnets are also used. This pertains in particular to electric machines, for example electric motors, particularly those used for single- or combined-drive vehicles (hybrid electric vehicles or battery electric vehicles) or for power steering drives. In addition, the magnets may also be advantageously used in medical areas as well, for example in magnetic resonance tomography units or the like.

Finally, the present invention concerns an electric machine comprising at least one permanent magnet according to the invention, and particularly a plurality thereof. In a particular embodiment, the electric machine is configured as an electric motor in which the permanent magnets are typically components of the rotor, and are for example embedded in a laminated core of the rotor or attached to its surface.

Figure 2:
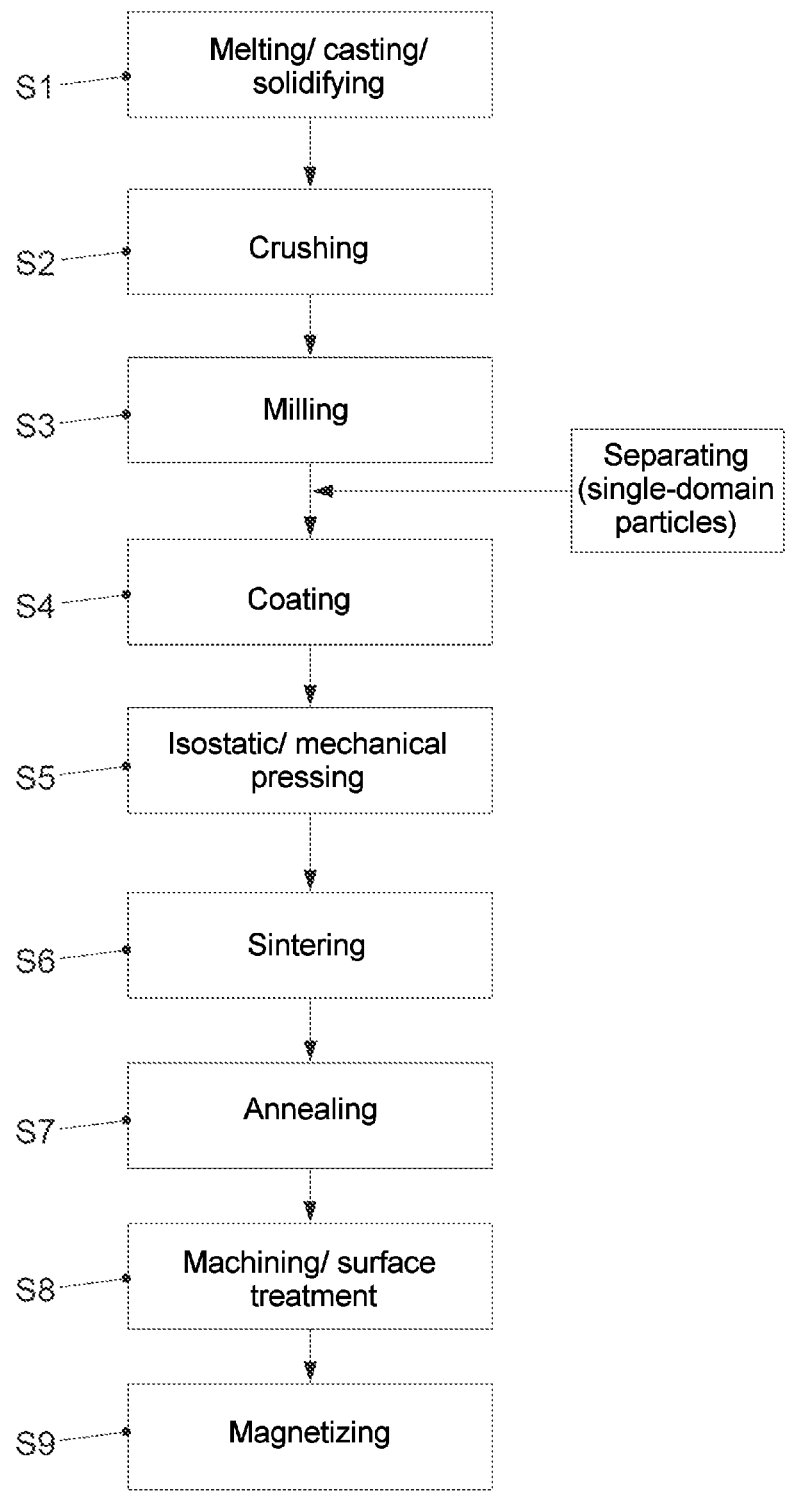
Figure 4:
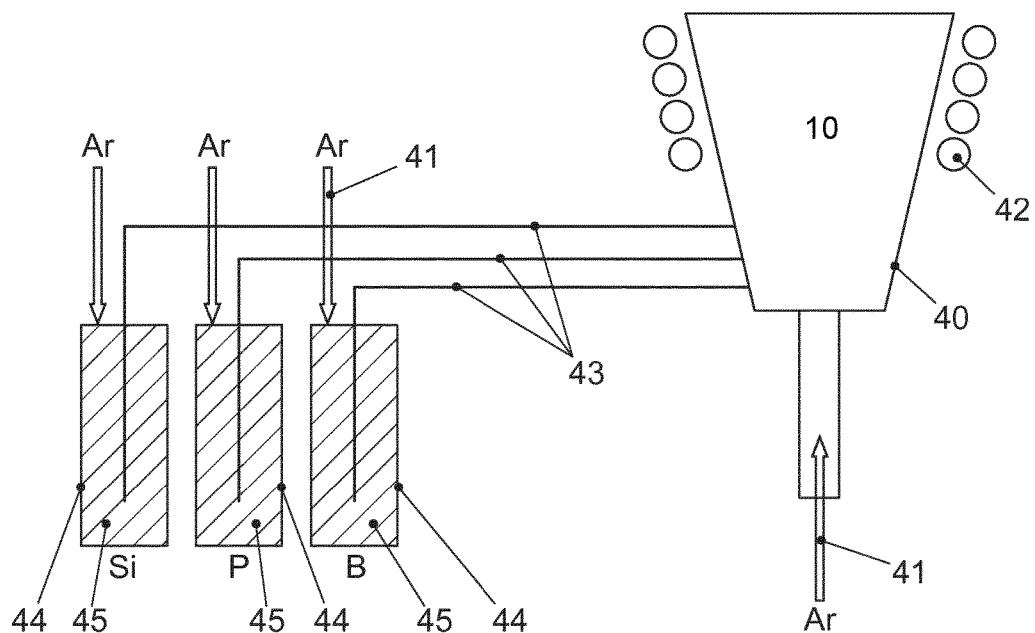
Figure 5:
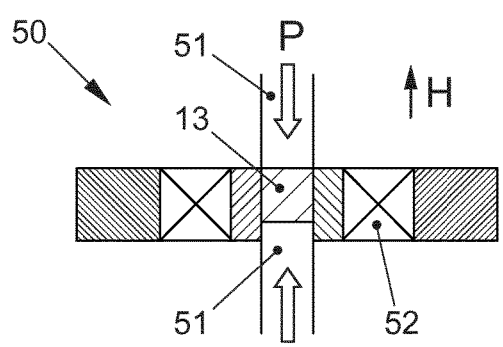
Figure 6:
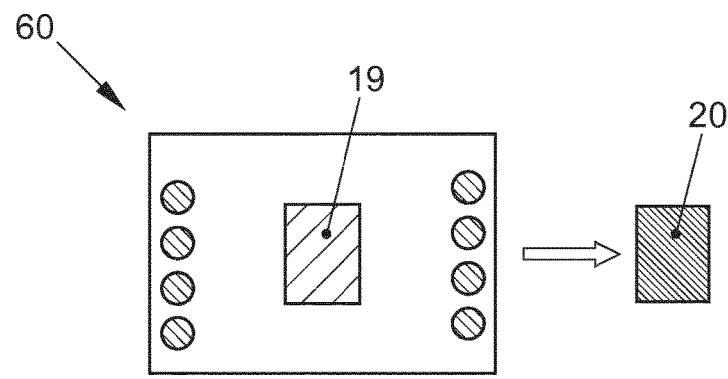

The invention will be explained in further detail below by means of working examples with reference to the figures. They show the following:

FIG. 1 a flow chart of a process of prior art for producing a permanent magnet;

FIG. 2 a flow chart of the process according to the invention for producing a permanent magnet according to a preferred embodiment;

FIG. 3 structural design of various intermediates of individual process steps and of the end product of the process according to the invention;

FIG. 4 CVD coating device for coating of the magnetic powder;

FIG. 5 pressing tool for mechanical pressing of the coated magnetic powder into a compact in a magnetic field;

FIG. 6 process step of sintering the compacts in an oven, and

Figure 7:
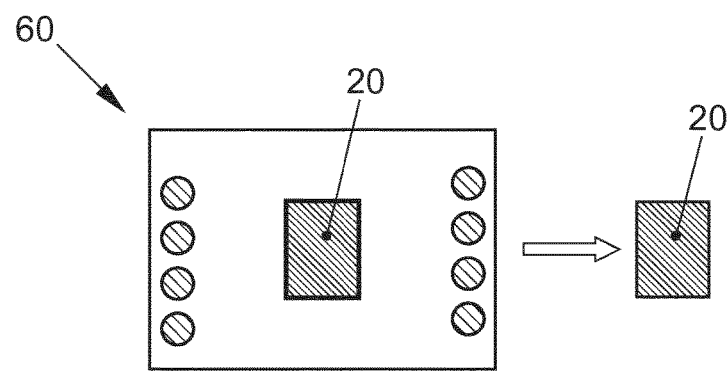

FIG. 7 process step of annealing the magnet in the oven.

An exemplary process for producing permanent magnets known in prior art is shown in FIG. 1 (middle column). The individual process steps are shown in figures on the left side, while the structural results of the individual process are shown in highly schematic form on the left side.

First, a ferromagnetic material (referred to below as a magnetic material) is e.g. melted in a vacuum induction oven, cast, and hardened by cooling. This gives rise to crystalline structures of isotropic alloys. After hardening, the e.g. bar-shaped substances are mechanically broken and then, for example, ground in a jet mill under a nitrogen atmosphere. The powder obtained in this manner consists of individual particles whose diameter is on the order of 3-5 µm. Optionally, the powder may be configured in an external magnetic field so that it is present in magnetically anisotropic form. The powder is then pressed into a compact (also called a green body) using a tool having a mechanical press, wherein a more or less compact structure is obtained depending on the pressing force used. Pressing may be carried out isostatically, wherein the pressing force is applied to the compact uniformly from all spatial directions, or anisostatically, wherein the pressing force as a rule is applied mechanically from one or from two opposite spatial direction(s). In the cases of prior magnetization, the pressing is carried out isostatically. Moreover, pressing can take place without an external magnetic field, so that an isotropic compact results, in which no magnetic crystal orientation is present. Far more commonly, however, pressing takes place in an external axial or transverse magnetic field, which results in anisotropic compacts in which a directed crystal orientation is present along the magnetization axis. In the following step, the compact is sintered. A person skilled in the art understands sintering to refer to a process in which fine-grained, ceramic, or metallic substances are heated under various atmospheres at temperatures less than or equal to their melting temperatures. Through the sintering process, the powder particles undergo mechanical bonds, sometimes including material bonds. For example, alloys of the type Nd—Fe—Bor, e.g. $Nd_2Fe_{14}B$, are used for sintering at temperatures in the range of 1,000 to 1,150° C. The growing together of individual microstructural crystals yields grains having a diameter on the order of 3 to 10 µm. After sintering, an isotropic body is present, as the Curie temperature was exceeded. Optionally, this can be followed by an annealing process, in which the magnet is subjected to further thermal treatment, but at a lower temperature than the sintering temperature (low-temperature treatment). The purpose of annealing is e.g. to reduce residual stresses in the crystal microstructure. After this, shape processing and/or surface treatment may be carried out in order to impart to the magnet a desired shape and dimensions. In particular, machining techniques are used, such as grinding, cutting, milling, or others. Moreover, surface coatings are common applied, for example epoxy resins or a metallic layer of copper, nickel, aluminum, or the like. By renewed insertion in an external magnetic field, the magnetic domains are remagnetized, provided that anisostatic pressing has not already been carried out.

A process is also known, in particular for magnetizing in what is referred to as the "Grain Boundary Diffusion Process" (GBDP), for improving the coercive field strength and the temperature resistance of the magnet. For this purpose, another substance is introduced into the magnet before it is coated, for example dysprosium Dy, terbium Tb, or copper Cu. The drawbacks of this step have already been discussed above.

In order to avoid the above-described crystal growth during sintering, a process is proposed according to the present invention which is described as an example below with reference to FIGS. 2 to 7.

The first steps S1 to S3, by means of which a powder of a magnetic material, e.g. an alloy with the composition $Nd_2Fe_{14}B$, is prepared, essentially correspond to the steps already described with reference to FIG. 1. In the scope of the process according to the invention, a powder is provided that after step S3 has a mean particle size of ≤3 µm, in particular ≤1 µm, and ideally 200 to 400 nm, and is thus present in the form of single-domain particles.

Optionally, separation of the powder particles may be carried out after the milling step S3. By separation of the particles, a defined particle size range is separated off, i.e. only one fraction of defined particle sizes is used in the further process. This makes it possible to achieve uniformity of particle sizes, resulting in high packing density of the magnetic cores (magnetic crystals) in the finished permanent magnet. This allows high magnetic field strengths to be achieved.

FIG. 3 shows a highly schematic view of the structural configuration of the intermediates of various process steps of the process. The powder 10 produced in step S3 shown in FIG. 2 is composed of particles 11 of the magnetic material 12. The magnetic orientations of the domains (see arrows) are statically distributed in the space, i.e., the material is magnetically isotropic. The mean particle diameter D in particular is less than or equal to 1 µm, and ideally 0.2 to 0.4 µm.

In the following step S4 (FIG. 2), coating of the powder particles with a layer of a diamagnetic or paramagnetic coating material or a chemical precursor material (precursor) thereof is carried out. This coating process is shown FIG. 4. In the example shown here, the coating is carried out by the process of chemical vapor deposition CVD. The powder 10 is swirled into a reaction chamber 40 by a carrier gas 41 of an inert gas, for example argon Ar or nitrogen $N_2$, and thus kept in the air. The reaction chamber 40 is equipped with a heating element 42. The reaction chamber 40 is also connected via lines 43 with storage containers 44, each of which contains a starting material 45 for the coating to be applied in the form of a volatile precursor compound. In the example shown, one of the containers 44 contains a precursor compound of silicon, a second contains a further precursor compound of phosphorus, and a third contains a precursor compound of boron. Depending on the coating to be applied, however, other compounds can also be retained, and in different numbers. By means of a further carrier gas flow 41, the volatile precursor compounds are sent via the lines 43 into the reaction vessel 40. Adjustment of a desired composition of the coating composition is carried out by adjusting the individual volume flows. In the reaction chamber 40, the precursor compounds undergo thermal decomposition (pyrolysis), and in most cases the elemental compounds of the zero oxidation stage emerge. These compounds, as a rule non-volatile, are deposited on the surfaces of the powder particles 11 of the powder 10 of the magnetic material, where they react with oxygen, which is preferably fed with the carrier flow 41 in specified amounts into the reaction chamber 40, to form corresponding oxides. It is also possible that the elemental components may oxidize to the corresponding oxides in the gas phase, i.e. before they have been deposited.

Figure 3A:
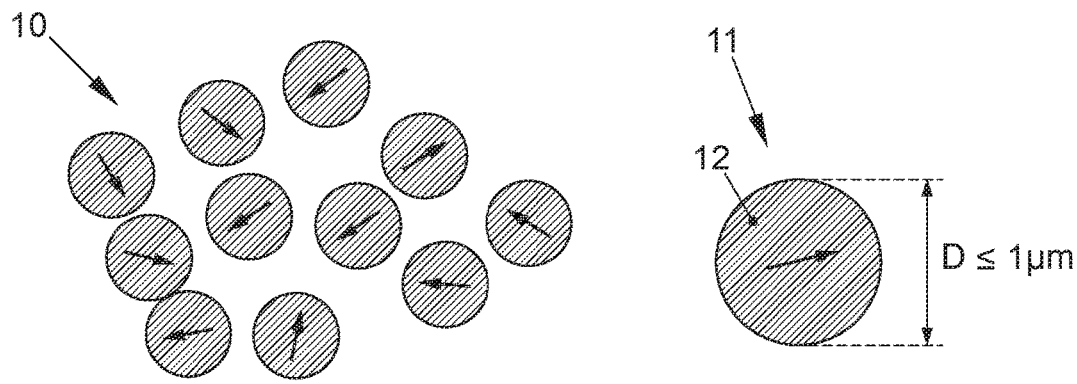
Figure 3B:
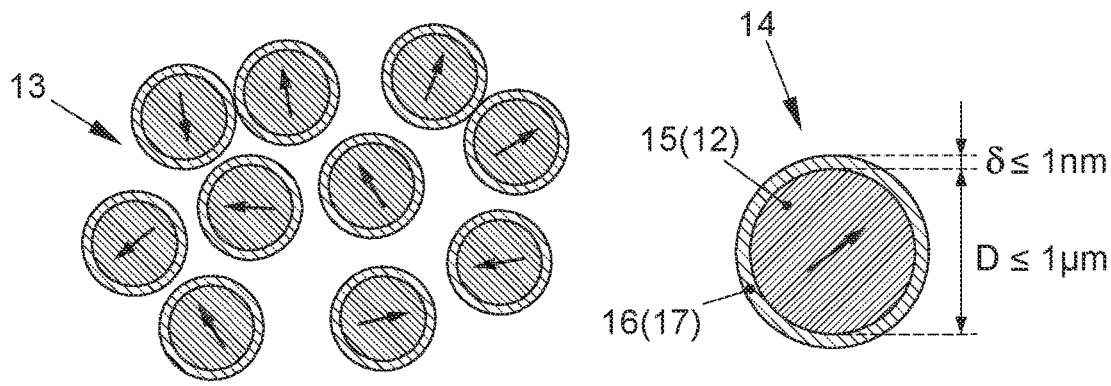

The result of the coating stage is shown in FIG. 3b. The coated powder 13 now consists of coated particles 14, each of which has a core 15 of the magnetic material 12 and a layer 16 of the coating material 17 that surrounds the core 15. Thus the particles 14 show a shell/core structure. For this reason, this process is also referred to here as the SCIP (Shell Core Isolation Process). In this stage, the coating material 17 still shows no glasslike structure. Rather, it is in the form of the powdered structure of the individual oxides of the starting material (in this example, silicon, phosphorus, and boron) and often has a white, non-transparent appearance ("white rust").

In the subsequent step S5 (cf. FIG. 2), the coated powder is pressed into a compact. This process is shown in FIG. 5, wherein 50 indicates a pressing tool that takes up the coated powder 13. The pressing tool 50 has two vertically movable press punches 51 that enclose and act on the powder 13 from two opposite sides, thus applying to it pressure p (anisotropic pressing). The pressing tool 50 also shows a coil 52 that produces an aligned axial magnetic field H so that the powder 13 is subject to the magnetic field H during pressing and is crystallographically oriented. The mechanical pressing in an axial field shown here corresponds to a preferred embodiment of the process. However, it is also possible to carry out the processing steps of the pressing and the magnetic orientation separately, i.e. first align the powder for isostatic pressing, carry out sintering, and finally carry out magnetization in an external magnetic field.

Figure 3C:
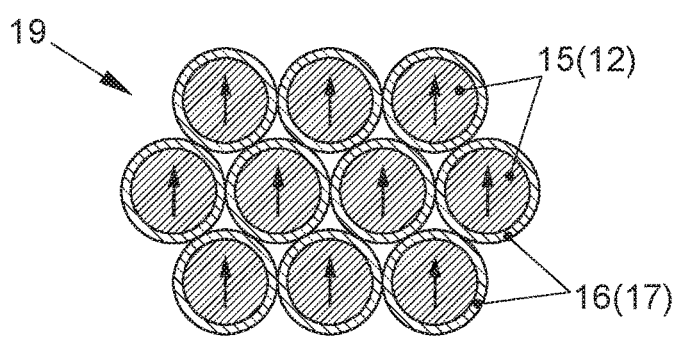

The result of the mechanical pressing in the magnetic field is shown in FIG. 3c. The product of the pressing is a compact 19, which is also referred to as a green compact or green body, in which the coated particles are compressed and are arrayed in more or less orderly fashion. Moreover, they show a common alignment of their magnetic dipoles, so that the compact 19 itself generates an external magnetic field. It should be noted that during pressing, conditions prevail in which no chemical change of the coating material 17 or the magnetic material 12 takes place. According to a preferred embodiment, no sintering of the coating material has (yet) taken place.

It is not until the subsequent step S6 (cf. FIG. 2) that sintering of the compact takes place, which is shown in FIG. 6. For this purpose, the compact 19 is placed in an oven 60. The compact 19 is heated to a temperature below the melting temperature of the magnetic material 12, but to a temperature at which the coating material 17 transitions to the glass phase (vitrifies) and undergoes sintering. In other words, the sintering shown in FIG. 6 takes place at a temperature within the transition range of the coating material (in this case the glass). Possibilities for the sintering atmosphere include a vacuum, a vacuum with a predetermined partial pressure of $N_2$ or Ar, a nitrogen, argon, or helium atmosphere, or an oxidative atmosphere, e.g. air, etc.

Following the sintering, the magnet should optimally be annealed (step S7 in FIG. 2), which is shown in FIG. 7. In this step, the magnet 20 is subjected to low-temperature treatment in the same or a different oven 16 from that of FIG. 6, in order to reduce mechanical stress in the magnet 20. A temperature is set that is less than or equal to the sintering temperature used in step S6. This annealing reduces residual stresses in the material, causing the crystal microstructure of the magnet to relax. The annealing temperature depends on the composition of the matrix material and is e.g. 250 to 550° C.

Following annealing, mechanical treatment of the magnet 20 may optionally be carried out (step S8 in FIG. 2) in order to impart to it a desired shape. However, the desired shape is preferably produced during the pressing of step S5. Moreover, the magnet may also be subjected to any desired surface treatments and/or coating processes. As a rule, because of the matrix, however, one may dispense with anti-corrosive coating.

If crystal orientation and the pressing in step S5 take place isostatically, the sintered compact is magnetized in a step S9 in an external magnetic field in order to orient the magnetic domains.

The steps of pressing (S5), sintering (S6), and magnetizing (S9) may be carried out in any desired sequence or in any desired combinations simultaneously. Pressing preferably takes place in the magnetic field simultaneously with magnetization (mechanical pressing), and even more preferably, all three processes should be carried out at the same time, i.e. the mechanical pressing takes place in the magnetic field under simultaneous temperature application in order to sinter the coating material. If pressing is carried out at room temperature (cold pressing), the pressing force is e.g. 250-800 MPa. In the case of hot pressing, the conditions are e.g. 50-150 MPa at 650-850° C.

Figure 3D:
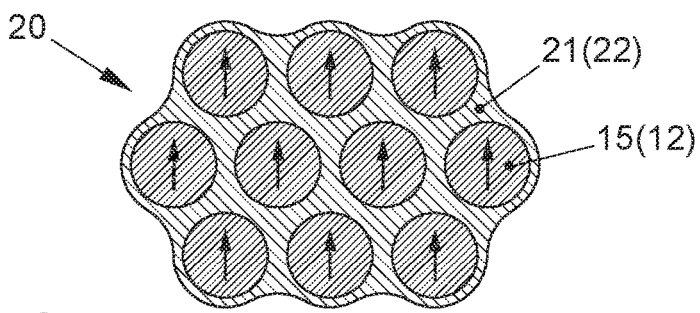

The result of the sintering and magnetization steps is shown in FIG. 3d. The produced permanent magnet 20 now shows a continuous matrix 21 of the matrix material 22, which in the present example consists of the glass formed and is typically, but not necessarily, transparent. This matrix 21 contains the embedded cores 15 of the magnetic material 12 in a more or less coordinated crystal packing. As sintering of the particles of the magnetic material was prevented by correspondingly selecting the process parameters of pressure and temperature throughout the entire sintering process, the particle diameters of the cores 15 continue to essentially correspond to the original mean particle diameter D of the powder 10, i.e. they measure in particular at the most 1 μm and are preferably in the range of 200 to 400 nm. The mean distance of the cores 15 within the matrix 21 is determined by the original coating thickness 8 of the coating 16 of the coating material 17. The distance is at the most 2 times the original coating thickness 8 of the coating 16 and is thus preferably in the range of a few nanometers, and in particular the mean distance should be in the range of ≤10 nm.

The magnet according to the invention, which can be produced by means of the process according to the invention, has the following advantages:
- increased coercive field strength and thus temperature resistance because of the reduced particle or grain size;
- corrosion resistance because of the coating of the metallic particles;
- greater mechanical strength (hardness) because of the reduced particle size and increased packing density;
- reduction in eddy currents occurring in the magnet because of the dielectric isolating effect of the coating in connection with the reduced particle size;
- higher efficacy because of electrical insulation of the particles (less eddy current=less heat generation in the magnet=higher temperature resistance);
- even distribution of magnetic flux, because there is no grain growth;
- no need to coat the final magnet;
- no or minimal delay connected with the magnets during sintering (this delay occurs in prior art, the magnets must be subjected to individual regrinding);
- narrower tolerance requirements can be achieved
- free of Dy and Tb (if desired)
- no complex phase formation;
- no formation of Nd-rich phase (liquid phase via material matrix), i.e. magnetic uncoupling of magnetic particles takes place via coating material=reduction in content of Nd to approx. 8% (reduced cost);
- no formation of undesirable η-phase;
- no formation of a Fe dendritic phase;
- no grain growth;
- no restrictions on magnet dimensions (in GBDP, magnet limited to <5 mm);
- elimination of risk of powder ignition;
- production processes (after powder coating) can be carried out in a normal atmosphere, problem-free storage of the powder;
- no residual porosity in the magnet after sintering;
- no effect of sintering processes on magnet alloy;
- environmentally friendly: magnet is 100% recyclable. Separation of magnet cores by heating the material matrix (liquid phase). SCIP remains intact, no agglomerate formation of magnet cores (magnetic particles).

REFERENCE NO. LIST

10 Powder
11 Particle
12 Magnetic material
13 Powder (coated)
14 Particle (coated)
15 Core
16 Coating
18 Coating material
19 Compact
20 Permanent magnet
21 Matrix
22 Matrix material
40 Reaction vessel
41 Carrier gas
42 Heating element
43 Lines
44 Reservoir container
45 Starting material
46 Carrier gas
50 Pressing tool
51 Press punch
52 Coil

The invention claimed is:

1. A process for manufacturing a nanostructured permanent magnet, comprising the following steps:
(a) providing a powder comprising particles of a magnetic material,
(b) coating the powder particles with a diamagnetic or paramagnetic coating material, wherein the step of coating the powder particles comprises a dry deposition process,
(c) pressing the coated particles into a compact,
(d) sintering the diamagnetic or paramagnetic coating material at conditions where no sintering of the magnetic material occurs, while transferring the diamagnetic or paramagnetic coating material into a continuous matrix of a diamagnetic or paramagnetic material embedding the particles of the magnetic material, wherein the diamagnetic or paramagnetic matrix material is selected from the group consisting of a glass, a glass ceramic, and a ceramic, wherein the glass and the glass ceramic are based on at least one of $SiO_2$, $Al_2O_3$, $Na_2O$, $K_2O$, $MgO$, $CaO$, $B_2O_3$, $TiO_2$, $PbO$, and $P_2O_5$, and the ceramic comprises at least one of mineral silicate ceramics, non-oxide ceramics, and oxide ceramics based on aluminum oxide or beryllium oxide, and (e) magnetizing the magnetic material in an external magnetic field, wherein steps (c), (d) and (e) may be carried out in any desired sequential order or simultaneously in any desired combinations.

2. The process as claimed in claim 1, wherein the step of sintering the diamagnetic or paramagnetic coating material is conducted at a temperature that is less than or equal to a transition temperature or a melting temperature of the coating material.

3. The process as claimed in claim 2, wherein the step of sintering the diamagnetic or paramagnetic coating material is conducted at a temperature that is at least 50 K lower than the transition or melting temperature of the coating material.

4. The process as claimed in claim 1, wherein the step of coating the powder particles comprises using a chemical precursor material of the coating material as a starting material, which, during or after the coating, undergoes a chemical reaction to form the coating material.

5. The process as claimed in claim 1, wherein the powder has a mean particle diameter of 3 μm or less.

6. The process as claimed in claim 5, wherein the powder has a mean particle diameter of 1 μm or less.

7. The process as claimed in claim 6, wherein the powder has a mean particle diameter in the range of 0.1 to 0.6 μm.

8. The process as claimed in claim 7, wherein the powder has a mean particle diameter in the range of 0.2 to 0.4 μm.

9. The process as claimed in claim 1, wherein the mean coating thickness of the coating produced in step of coating the powder particles is 100 nm or less.

10. The process as claimed in claim 9, wherein the mean coating thickness is in the range of 1 to 10 nm.

11. The process as claimed in claim 10, wherein the mean coating thickness is in the range of 2 to 5 nm.

12. The process as claimed in claim 1, wherein the magnetic material is a ferromagnetic metal, or a ferromagnetic metal alloy, selected from RE-TM-B alloys or RE-TM alloys, wherein RE is a rare earth element, TM is a transition metal of the iron group, and B is boron.

13. The process as claimed in claim 1, wherein the dry deposition process is a chemical or physical vapor phase deposition process.

14. A process for manufacturing a nanostructured permanent magnet, comprising the following steps:

(a) providing a powder comprising particles of a magnetic material, (b) coating the powder particles with a diamagnetic or paramagnetic coating material, wherein the mean coating thickness of the coating produced in step of coating the powder particles is 100 nm or less, (c) pressing the coated particles into a compact, (d) sintering the diamagnetic or paramagnetic coating material at conditions where no sintering of the magnetic material occurs, while transferring the diamagnetic or paramagnetic coating material into a continuous matrix of a diamagnetic or paramagnetic material embedding the particles of the magnetic material, wherein the diamagnetic or paramagnetic matrix material is selected from the group consisting of a glass, a glass ceramic, and a ceramic, wherein the glass and the glass ceramic are based on at least one of $SiO2$, $Al2O3$, $Na2O$, $K2O$, $MgO$, $CaO$, $B2O3$, $TiO2$, $PbO$, and $P2O5$, and the ceramic comprises at least one of mineral silicate ceramics, non-oxide ceramics, and oxide ceramics based on aluminum oxide or beryllium oxide, and (e) magnetizing the magnetic material in an external magnetic field, wherein steps (c), (d) and (e) may be carried out in any desired sequential order or simultaneously in any desired combinations.

15. A process for manufacturing a nanostructured permanent magnet, comprising the following steps:

(a) providing a powder comprising particles of a magnetic material, wherein the powder has a mean particle diameter in the range of 0.1 to 0.6 μm, (b) coating the powder particles with a diamagnetic or paramagnetic coating material, (c) pressing the coated particles into a compact, (d) sintering the diamagnetic or paramagnetic coating material at conditions where no sintering of the magnetic material occurs, while transferring the diamagnetic or paramagnetic coating material into a continuous matrix of a diamagnetic or paramagnetic material embedding the particles of the magnetic material, wherein the diamagnetic or paramagnetic matrix material is selected from the group consisting of a glass, a glass ceramic, and a ceramic, wherein the glass and the glass ceramic are based on at least one of $SiO2$, $Al2O3$, $Na2O$, $K2O$, $MgO$, $CaO$, $B2O3$, $TiO2$, $PbO$, and $P2O5$, and the ceramic comprises at least one of mineral silicate ceramics, non-oxide ceramics, and oxide ceramics based on aluminum oxide or beryllium oxide, and (e) magnetizing the magnetic material in an external magnetic field, wherein steps (c), (d) and (e) may be carried out in any desired sequential order or simultaneously in any desired combinations.

* * * * *